United States Patent [19]

Schaible

[11] 3,921,094

[45] Nov. 18, 1975

[54] PHASE-LOCKED FREQUENCY SYNTHESIZER WITH MEANS FOR RESTORING STABILITY

[75] Inventor: Clifford Warren Schaible, Morristown, N.J.

[73] Assignee: Bell Telephone Laboratories, Incorporated, Murray Hill, N.J.

[22] Filed: Oct. 7, 1974

[21] Appl. No.: 512,537

[52] U.S. Cl..................... 331/1 A; 307/273; 328/41; 328/133; 331/8; 331/10; 331/17; 331/25; 331/27; 331/116 R; 331/117 R; 331/177 V

[51] Int. Cl.$^2$............................................ H03B 3/04

[58] Field of Search............. 331/1 A, 8, 10, 17, 18, 331/25

[56] References Cited

UNITED STATES PATENTS

| | | | |
|---|---|---|---|
| 3,069,504 | 12/1962 | Kaneko | 179/15 |
| 3,586,992 | 6/1971 | Garfein | 331/17 |
| 3,663,762 | 5/1972 | Joel, Jr. | 179/41 A |
| 3,723,888 | 3/1973 | Ellis | 328/134 |
| 3,729,688 | 4/1973 | Cerny, Jr. et al. | 331/1 A |
| 3,806,817 | 4/1974 | Uchida | 325/418 |

OTHER PUBLICATIONS

Gardner, "Phaselock Techniques," John Wiley & Sons, Inc., New York 1966, pp. 48–53.

*Primary Examiner*—Siegfried H. Grimm
*Attorney, Agent, or Firm*—Wilford L. Wisner

[57] ABSTRACT

A cellular type high capacity mobile communication system requires a large number of channels for use on a selective basis within each of several small cells. In the system described, switching from one channel to another to avoid interference within the new cell is accomplished as the mobile communicator moves from one cell to another. Both the base station within each cell and the mobile units require the means for generating the necessary frequencies and for pulling in the frequency of the transmitter or receiver of the base station and the mobile unit rapidly and stabilizing it at the new frequency. In this frequency synthesizer, phase-locked loop instability resulting from overleaping intermediate channel frequencies is overcome by detecting, ahead of the frequency and phase comparator, the absence of an output from the frequency countdown circuitry of the feedback portion of the phase-locked loop. The signal that is representative of the absence of the normal feedback signal or its complete lack is applied to a transistor circuit that biases the voltage-controlled oscillator to the midpoint of its range and that has such a low output impedance that it "swamps out" the relatively high output impedance of the feedback path after the comparator. As a stable feedback signal is restored so that a detectable frequency countdown signal is obtained, the transistorized circuit is disconnected. The mode of operation of this transistorized circuit is somewhat analogous to circuits commonly called crowbar circuits.

5 Claims, 10 Drawing Figures

PHASE-LOCKED FREQUENCY SYNTHESIZER WITH MEANS FOR RESTORING STABILITY

BACKGROUND OF THE INVENTION

This invention relates to frequency synthesizers of the type employing digitally responsive phase-locked loops.

There has been substantial commercial interest recently in very high capacity mobile communication systems of the type that are now typically called cellular mobile communication systems. Each cell in such a mobile communication system is typically cell circularly symmetrical, for example hexagonal and has an effective diameter of no more than a few miles.

The key to conserving bandwidth in such a cellular mobile communication system covering a substantial service area is the ability to reuse carrier frequencies. The more closely geographically frequencies can be reused, the greater the frequency bandwidth saving of the overall cellular mobile communication system.

In implementing such a system a frequency synthesizer is needed; and one attractive choice for such a synthesizer is the type employing a digitally responsive phase-locked loop. The synthesizer is used to generate several hundred transmit and receive channels; and at least one synthesizer is required for each base station and each mobile communication radio.

When a mobile communication unit crosses a cellular line and must switch from one carrier frequency to a new carrier frequency to avoid interference with communications already under way in the new cell, it must shift to a new frequency, frequently one which is far removed from the frequency which the unit had used in the cell it just left. When it must overleap hundreds of channels in order to accomplish the shift, a problem of stability of frequency control is encountered. This problem may be understood in more detail by considering that the most economical synthesizers are those which use a digitally responsive phase-locked loop.

The reason for using a phase-locked loop with digital circuits in the feedback loop is the substantially reduced cost as compared to the use of groups of switched crystal oscillators. The cost savings is especially significant when generating hundreds of operating channels. In order to obtain maximum economy from the digitallyresponsive phase-locked loop, it is desirable to use low cost, commercially available integrated circuits; such circuits typically have limited frequency response.

The frequency response problem for the digital feedback loop is typically alleviated by employing count-down circuits so that at least much of the circuitry does not have to respond at the higher frequency of the carrier signal.

Nevertheless, it is possible during some frequency changes for the frequency to be changed so much within the available band, that the count-down circuits in the feedback loop are driven at rates beyond their capabilities. When this happens, the cascade arrangement of count-down circuits fails to respond; that is, it does not register and the output signal of the feedback loop is at its zero or quiescent value.

BRIEF SUMMARY OF THE INVENTION

I have recognized that a frequency synthesizer of this type can be stabilized by resetting the phase-locked loop to the mid-point of its operating range and then allowing pull-in to the new frequency to occur therefrom.

According to my invention, a frequency synthesizer for use in both the mobile and base stations of a cellular type mobile communication system overcomes phase-locked loop instability resulting from too rapid a change of channels by detecting, ahead of the frequency and phase comparator, the fall to zero of the feedback frequency-count-down circuitry output and applying this zero signal to operate a transistorized circuit that biases the voltage-controlled-oscillator to the mid-point of its range and that has such a low output impedance that it "swamps out" the relatively high output impedance of the feedback path following the comparator. As stability is restored and a detectable count is obtained from the count-down circuitry, the low impedance stabilizing transistorized circuit is disconnected.

BRIEF DESCRIPTION OF THE DRAWINGS

Further features and advantages of my invention will become apparent from the following detailed description taken together with the drawings in which.

DESCRIPTION OF ILLUSTRATIVE EMBODIMENTS

Figure 1:
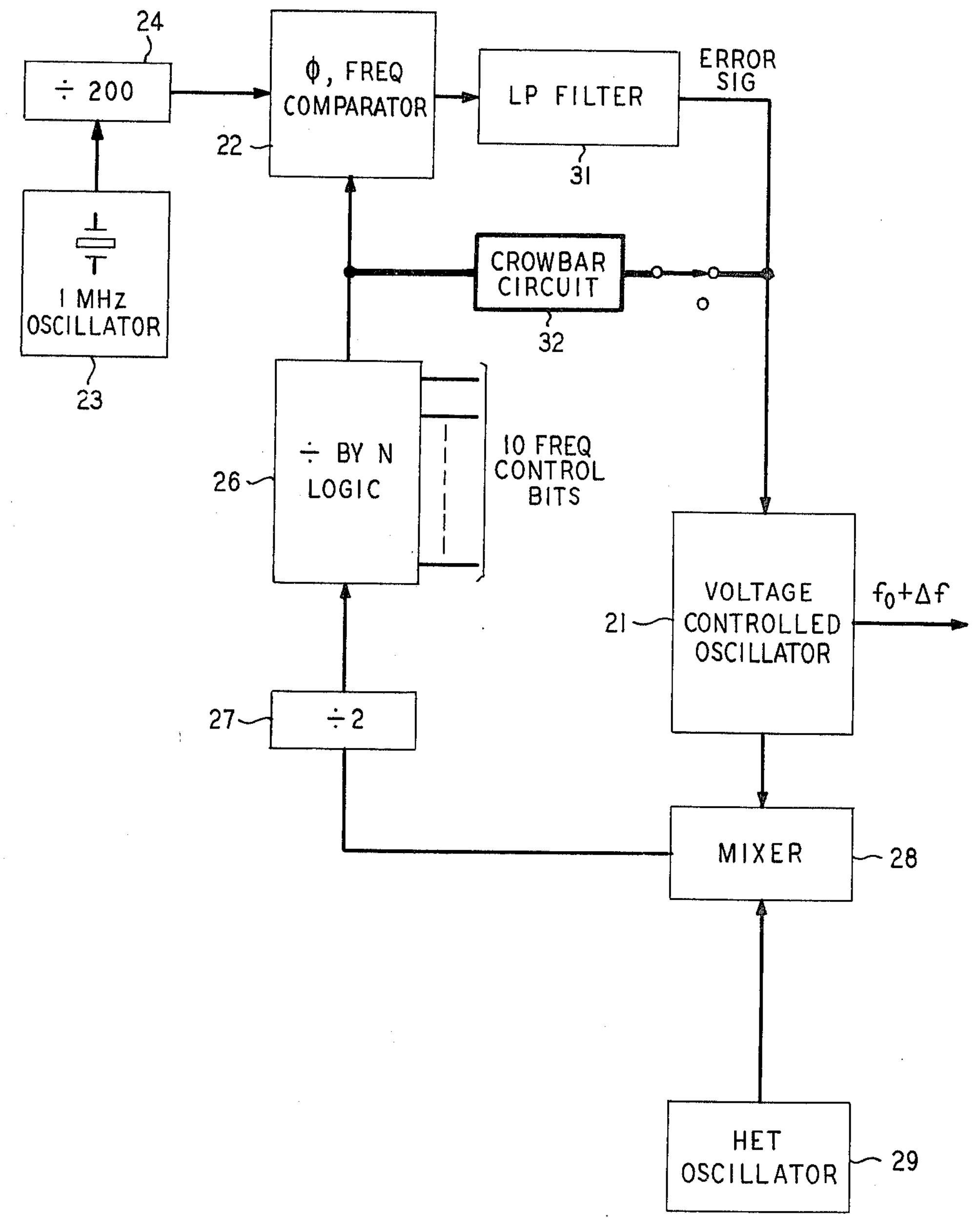
FIG. 1 is a block diagrammatic illustration of a preferred embodiment of my invention.

Except for the new feature added by my invention, a frequency synthesizer of the type shown in FIG. 1 is of a well-known type that uses a phase-locked loop to select a desired output frequency. Such a loop includes a voltage-controlled oscillator 21 of well-known type, a phase and frequency comparator 22, a reference frequency oscillator or source such as the oscillator 23 together with its output divider circuit 24, and a feedback loop from the voltage-controlled oscillator 21 to comparator 22 to provide the input with which the output of the reference oscillator is compared. That feedback loop includes the mixer 28 to one input of which the output of oscillator 21 is coupled and to the other input of which the output of heterodyne oscillator 29 is coupled. The output of mixer 28 is coupled to a series of divider or count-down circuits 26 and 27 so that comparator 22 is able to operate at a lower frequency than would otherwise be the case. In fact, the circuits 26 are therefore able to operate at lower frequencies than circuit 27 and are examples of a general type of digital logic for implementing the circuits 27 and 26.

According to my invention, there is added to such a standard circuit a stabilizer circuit hereinafter referred to as a crow bar circuit 32 which has its input connected to the output of logic circuits 26 and has its output connected into the feedback loop between the low pass filter 31 and the voltage-controlled oscillator 21. It is well-known of course that all such loops have a low pass filter such as the filter 31 after the comparator.

The basic operation of the embodiment of FIG. 1 is as follows: a portion of the output of voltage-controlled oscillator 21 is sampled by mixer 28 and a subharmaonic of the voltage-controlled oscillator frequency or of the frequency-shifted output from mixer 28 is generated by digital count-down circuitry 27 and 26. The total 2 × N division ratio is determined by dc voltages or so-called frequency control bits applied to other inputs of the circuitry 26. The subharmonic output that is the output of circuitry 26 is compared to the stabilized reference signal output of circuit 24 by phase and frequency comparator 22 which produces a dc error voltage in cooperation with the low pass filter 31 that drives the voltage-controlled oscillator to a different frequency until the error voltage falls to zero.

When the system is in phase lock, the self-excited voltage controlled oscillator, which has an inherently poor stability is forced to take on the relatively good phase stability of the crystal-controlled oscillator of the reference source 23, 24. Many discrete output frequencies easily exhibit the same reference stability and can be derived from the apparatus of FIG. 1 by changing the division factor N, since the phase-locked loop constrains the frequency from circuit 26 to equal the frequency from circuit 24, as well as inducing phase lock. A change in the factor N must induce a discrete frequency shift of the output of the voltage-controlled oscillator 21. It should be clear that the control bits applied to circuit 26 could be arranged to force the factor N to change only in a sequence of single integer steps, or that it could change the factor N by a large amount all at once. The latter in fact may be necessary for providing substantially continuous commercial service as a mobile unit passes from one communication cell to another.

If the change is too large, the circuitry 27 and 26 may fail to respond and then may generate a zero output, that is an output representative of the quiescent feedback signal from circuit 26. Since this signal has no necessary relationship to the demand being made by the control bits or even to the frequency of the reference source as it appears from circuit 24, comparator 22 and low pass filter 31 generate in general a large error signal typically driving voltge-controlled oscillator 21 toward higher frequency.

Since a feedback does not occur which will tend to reduce the error signal, the frequency at voltage-controlled oscillator 21 changes until it reaches one limit of its range, at which it is only partially stable. This output signal from oscillator 21 has no relationship to the frequency demanded by the control bits applied to circuit 26.

I provide the crow bar circuit 32 to restore the voltage-controlled oscillator 21 to a frequency at which it is held stable long enough that circuits 27 and 26 can effectively count again and produce a meaningful output thereafter normal pull in and lock in to the demanded frequency can occur.

To accomplish this, crow bar circuit 32 substitutes effectively a fixed reference potential applied to oscillator 21 for the variable error signal or potential applied from the feedback loop. It exerts such a powerful effect on oscillator 21 that oscillator 21 is not allowed to see the feedback loop regardless of what the error signal might otherwise be. Once the oscillator 21 is again operating at the mid-point of its range, the reappearance of a detectable output from circuit 26 disconnects cross bar circuit 32.

The implementation of all the previously designated circuitry involved substantial complexity but of a conventional type except for crow bar circuit 32 and its interconnection with the remainder of the apparatus.

Figure 2:
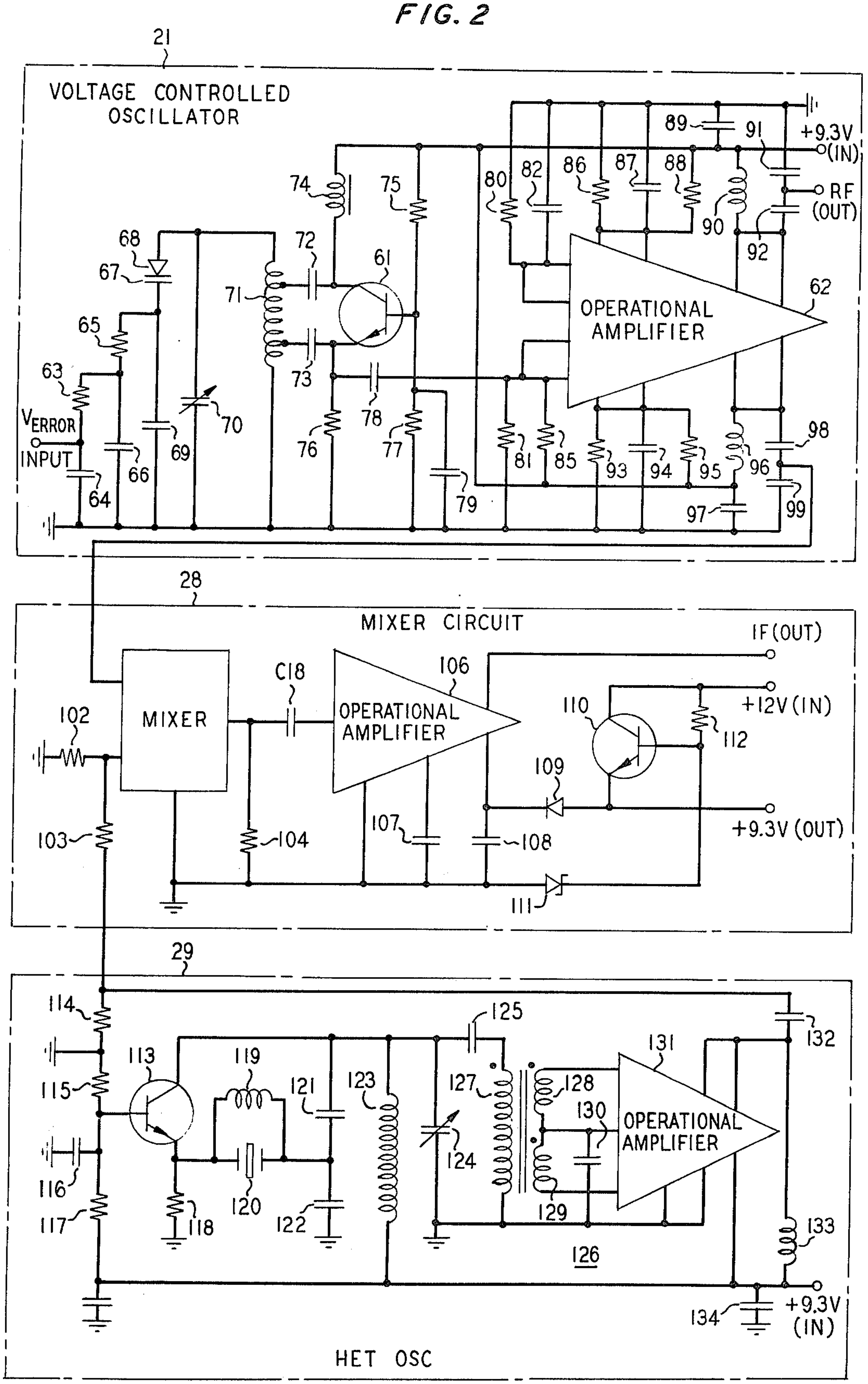
FIG. 2 is a schematic diagram of the voltagecontrolled oscillator mixer circuit and heterodyne oscillator of the embodiment of FIG. 1.

The detailed circuit of most of the apparatus of FIG. 1 will be described only briefly hereinafter. For example, FIG. 2 shows a preferred circuit embodiment for the voltage-controlled oscillator 21 and mixer circuit 28 and the heterodyne oscillator 29. These circuits may all use commercially available integrated circuit chips or hybrid integrated circuit packs which are typically built economically to meet high demand. Operational amplifiers such as 62, 106, 131 all employ extensive circuits of conventional type as shown to shape the gain characteristic of the operational amplifier.

The voltage-controlled oscillator operates for example at 200 MHz and typically provides 5 milliwatt output into a 50 ohm load (now shown). This load will typically be in the utilization apparatus to which the output frequency $F_0$ is applied. Circuits 21, 28 and 29 for operation at such a frequency are well-known and widely commercially available and need not be described here.

Figure 3:
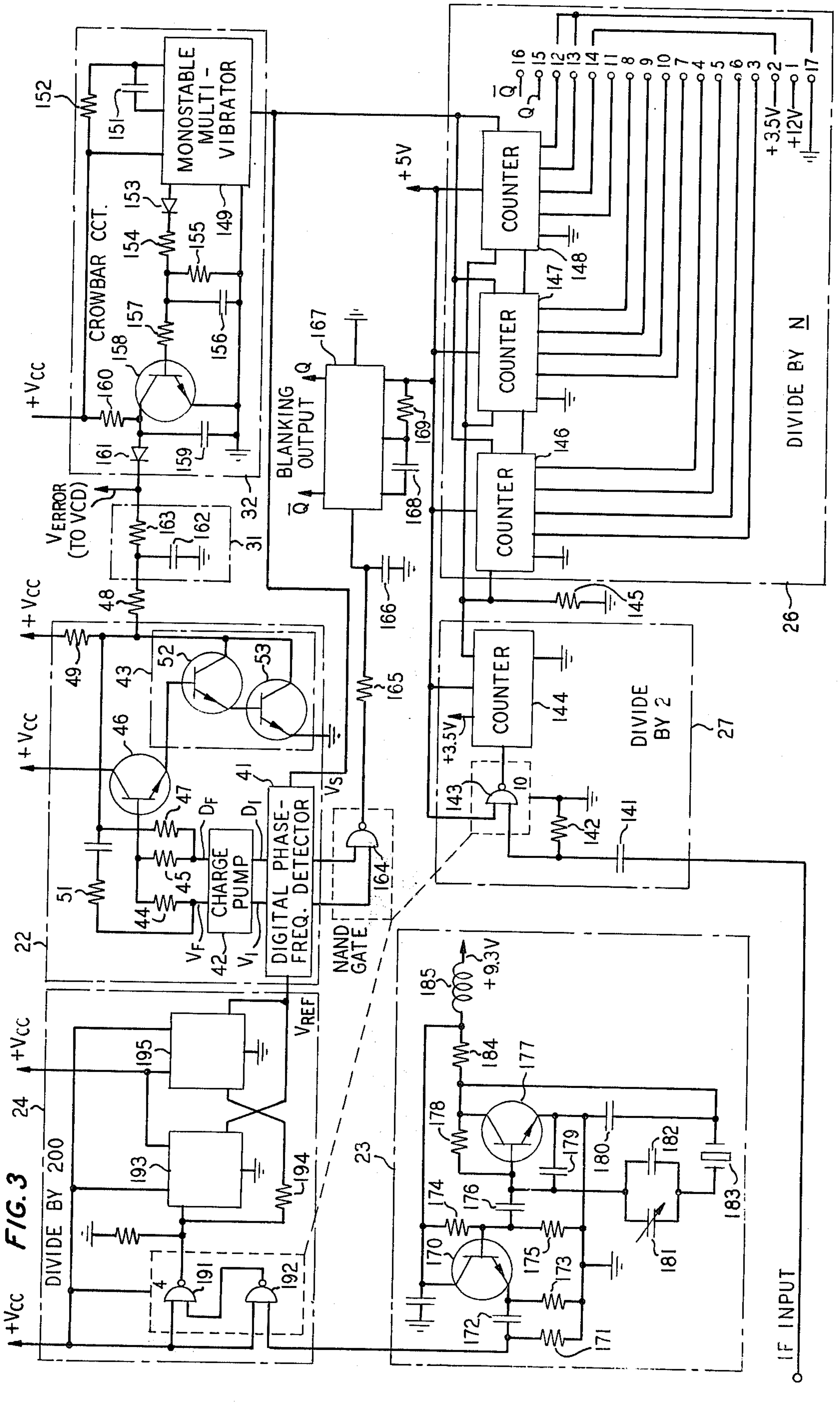
FIG. 3 is a schematic and block diagrammatic illustration of the remaining circuitry of the embodiment of FIG. 1.

The typical interconnection of the remaining circuitry of FIG. 1 is illustrated in FIG. 3. The intermediate frequency input from the mixer circuit 28 is shown in the lower left corner of the diagram of FIG. 3. The count-down or "divide by N" circuitry shown in FIG. 3 is fabricated from any of the well-known low power or medium-power logic families of integrated circuits. These circuits will inevitably have a switching capacity well below the radio frequency of oscillator 21. Therefore, the mixer circuit 28 with the heterodyne oscillator circuit 29 including its doubler circuit are introduced into the system to beat the voltage-controlled oscillator frequency down to a level compatible with the switching speed of the selective logic circuit 27. The circuit 27 is basically a prescaler that reduces the bandwidth over which the divide by N circuits 26 must operate for a given voltage-controlled oscillator frequency range. That range is determined by the number of required operating channels and the frequency separation between them. The low pass filter 31 sets the loop band pass characteristics which in turn control the synthesizer switching characteristics. These characteistics are determined by standard servo-mechanism feedback loop criteria, which are well-known in the automatic control-art. For many frequency synthesizer apparatuses, it becomes impossible to maintain phase lock, due to loop band pass considerations if a large number of channels must be traversed in a single step. It must be remembered that it is desired that the counter circuits 26 including counters 146, 147, and 148 are desired to be low power, lost cost integrated circuits, which implies relatively modest frequency response ranges.

An instability caused by too large a step change in frequency is prevented by the crow bar circuit 32, the input portion of which is a monostable multivibrator 149 which widens the pulse width to a pulse which can be more easily handled by the following circuitry. It may be noted that the input of monostable multivibrator 149 is connected in parallel with the second input of the phase frequency comparator 22.

The function of the crow bar circuit 32 is to continuously monitor the presence of the pulse train from the divide by N count-down circuit 26. If the pulse train falls below a predetermined rate, the crow bar circuit 32 switches low impedance fixed bias on the voltage-controlled oscillator to override the higher impedance error voltage coming from the low pass filter 31. This low output impedance is basically provided by the circuit including resistor 160, diode 161 and capacitor 159 across the emitter and collector of transistor 158. This circuit applies a certain proportion of the battery voltage supply, plus $V_{cc}$ of the transistor circuit to the input of the voltage-controlled oscillator. The basic switching element of the circuit is diode 161 which is back biased when transistor 168 is conducting but is quickly forward biased when the transistor 158 is turned off. The transistor 158 is driven by the lengthened pulses from monostable multivibrator 149.

The output impedance of the phase and frequency comparator 22 is made substantially higher than that of the crow bar circuit 32 by providing that the load impedance 49 for the output amplifier including transistors 52 and 53 and comparator 22 in series with resistor 48 and 163 is larger than the impedance looking back at the resistor 160. The oscillator 23, it may be seen, is very similar to the crystal controlled oscillator 29 of FIG. 2 except for the additional complication introduced into oscillator 29 because of the frequency doubling and except that oscillator 23 employs an anti-resonant crystal circuit; whereas oscillator 29 employs a series resonant crystal circuit. That is, those oscillator circuits are all fairly conventional circuits.

The logic involved in divide by 200 ciircuit 24 is very similar to the logic involved in the other countdown circuits such as 26 and 27; and the latter will be described in more detail hereinafter.

It may also be appreciated that the comparator 22 comprises the digital frequency and phase comparator detector 41 to be described hereinafter followed in tandem by the charge pump 42, the driver transistor 46 for the output amplifier 43 and the transistor 52 and 53 of the output amplifier 43. The inputs for the digital detector 41 come respectively from the reference source 23, 24 and from the count-down circuitry 26. The digital detector 41 also drives a NAND gate 164, which drives a blanking pulse generator 167 to provide a blanking pulse, illustratively 100 milliseconds long, to mute the transmitter and receiver during frequency shifts. In other words, the output, $\overline{QQ}$, of the blanking pulse generator 167 is applied directly to the power amplification circuitry that follows the frequency selection circuitry in the transmitter or receiver. This connection is outside of the scope of the apparatus described in detail in this application.

Figure 4:
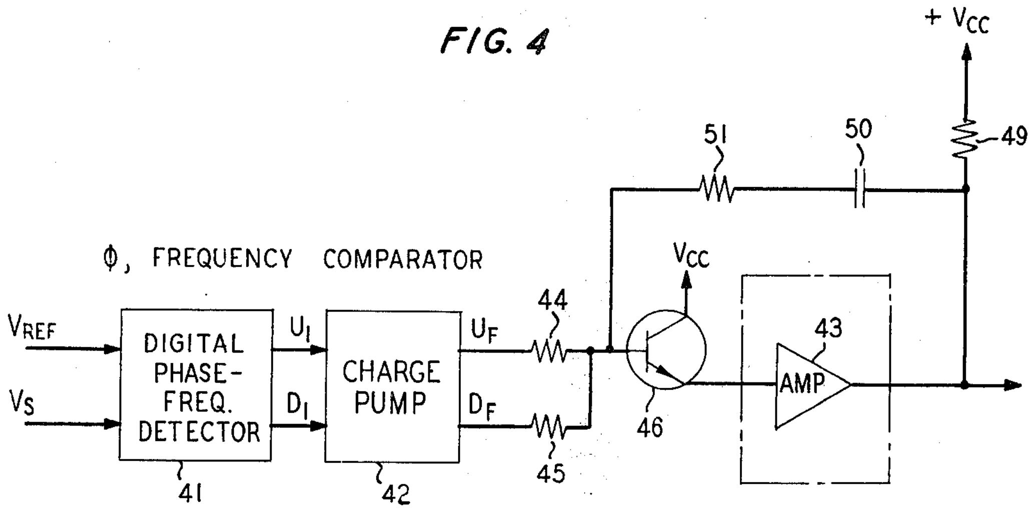
FIG. 4 is a partially schematic and partially block diagrammatic illustration of the internal arrangement of the phase and frequency detector shown in FIGS. 1 and 3 arranged in a way to help clarify function.

The operation of the phase and frequency comparator 22 of FIGS. 1 and 3 may be most easily understood by considering the showing of the comparator that is provided in FIG. 4. The first component of the comparator 22 is digital phase frequency detector 41 which will be described in more detail hereinafter in connection with FIG. 6, the charge pump 42 which is described hereinafter in connection with FIG. 7A, a coupling amplifier circuit including the transistor 46, two input signal paths through resistors 44 and 45 connected at the base thereof and a feedback path including capacitor 50 and resistor 51 from the ultimate output point of comparator 22. The coupling transistor 46 provides the input to the final amplifier 43 of the comparator. Amplifier 43 is shown hereinafter in FIG. 7B and involves simply two interconnected transistors 230 and 231. Transistor 231 has a common emitter configuration; resistor 49 is the load. Transistor 230 raises the input impedance seen looking into the amplifier; it acts as emitter follower and provides no gain. A digital phase detector 41 actually contains two digital phase detectors which have common inputs. Phase-frequency detection in one of the two circuits is locked in and causes both outputs to be high when the negative transitions of the variable input signal and reference input signal are equal in phase and frequency. If the variable input is lower in frequency or lags in phase, the $U_1$ output goes low; conversely, the $D_1$ output goes low when the variable input is higher in frequency or leads the reference input phase. It is important to note that the duty cycles of the reference phase and the reference input are not important since negative transitions control system operation.

The second phase detector circuit, which is an optional substitute for the first circuit, in digital detector 41, on the other hand, is locked in when the variable input phase lags the reference phase by 90°, as indicated by its output data going low with equal pulse widths. If the variable input phase lags by more than 90°, one of its outputs will remain low longer than the other and, conversely, if the variable input phase lags the reference phase by less than 90°, the second output of the second phase detector remains low longer than the first. In this second circuit, the variable input and the reference must have 50 percent duty cycles. The charge pump accepts the phase detector outputs, the $U_1$ signal coming from the previously selected one of the above-described circuits, and the $D_1$ output signal also coming from that circuit and applies them to the output coupling and amplification circuitry of the comparator 22. The charge pump converts the phase detector outputs to fixed amplitude positive and negative pulses, which are the signals UF and DF, respectively. These pulses are applied to the coupling circuit including transistor 46 and its feedback circuit which acts as an active filter actually a lag compensation network, and ultimately to the output amplifier 43. The active filter provides a dc voltage proportional to the phase error.

Figure 5:
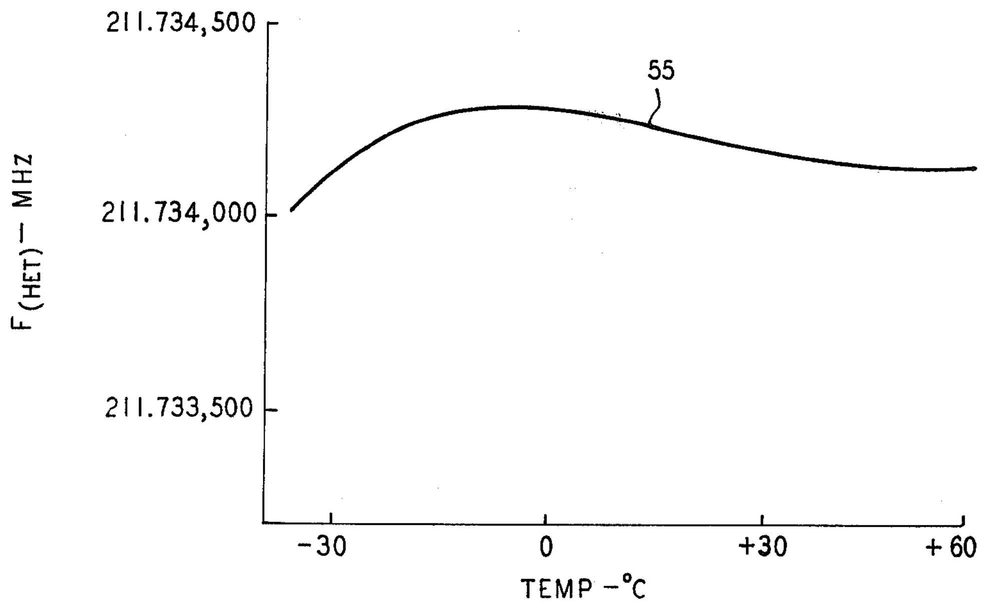
FIG. 5 shows a curve illustrating the variation of the frequency of the heterodyne oscillator with temperature.

The temperature stability curve 55 shown in FIG. 5 for the heterodyne oscillator 29 is of a conventional type and need not be discussed further here. It is one of the primary determinants of the overall stability of the system and at the same time must be provided economically in a practical system.

Figure 6:
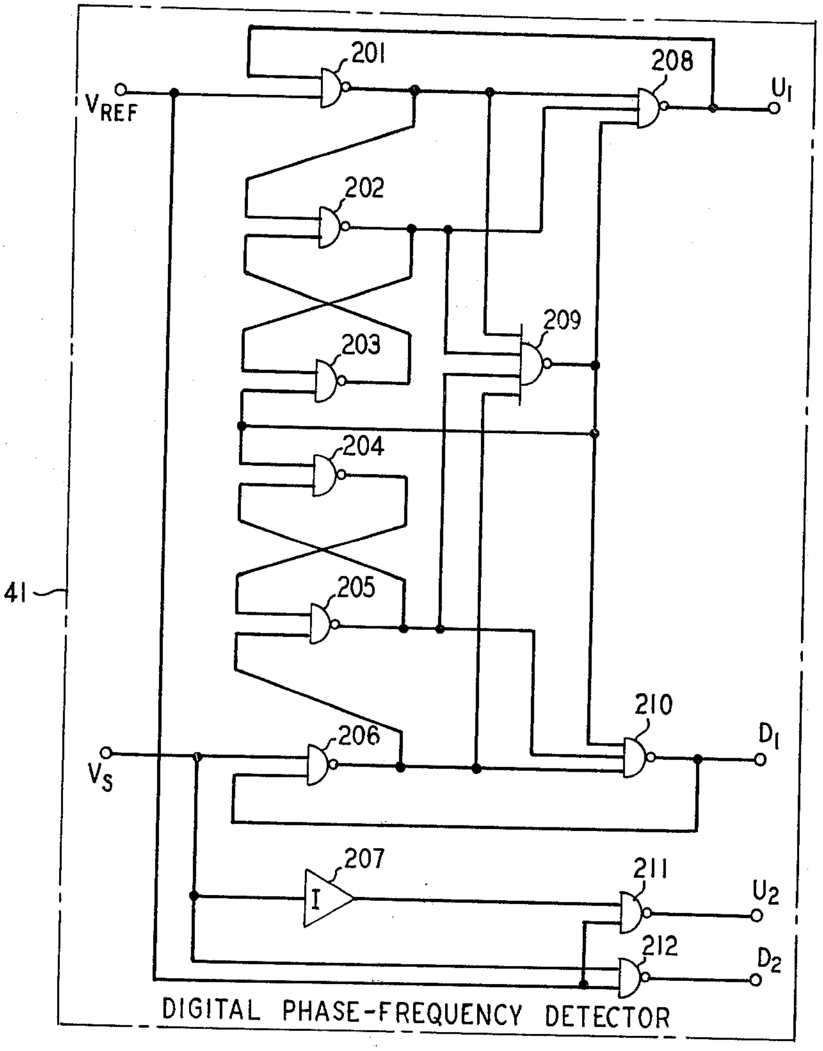
FIG. 6 is a schematic illustration of a typical digital phase and frequency detector employed as a subcomponent of the diagrams of FIGS. 3 and 4.

The internal arrangement of digital phase and frequency detector 41 is shown in FIG. 6. The digital circuitry includes gates 201 through 212 coupled in the arrangement shown between the inputs at which the variable input signal $V_S$ and the reference input signal $V_{REF}$ are applied and the output terminals at which the signals $U_1$, $D_1$, $U_2$, and $D_2$ are generated. By interconnecting these gates, which are all AND gates, together as shown with one operational amplifier 207, the logical principles described above for comparator 22 are achieved. In the practical application of this circuit, there are just ultimately two output terminals for the detector 41, as one or the other of the two detectors are selected for use for the particular application.

Figure 7A:
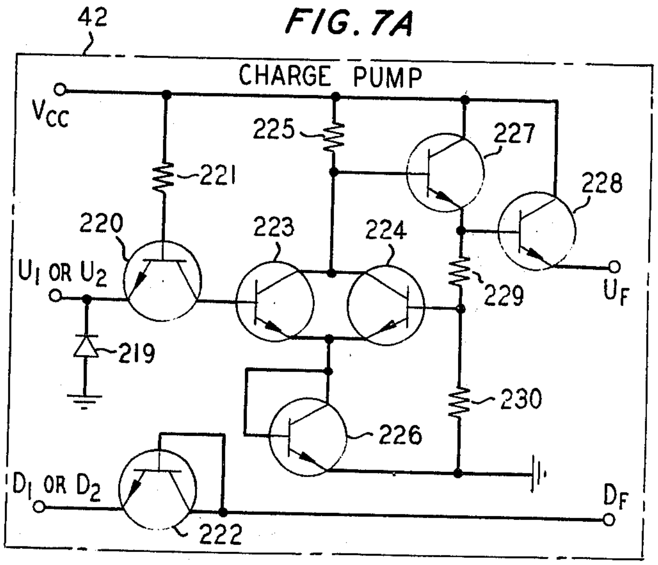
FIGS. 7A and 7B are schematic diagrams of a charge pump and an output amplifier of a typical phase and frequency detector and correspond to portions of the diagrams of FIGS. 3 and 4.
Figure 7B:
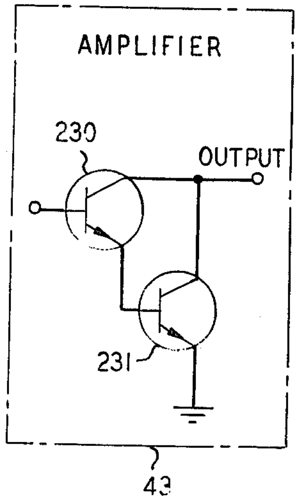

In FIG. 7A the desired fixed amplitudes of positive and negative pulses are capable of being generated by the charge pump 42 by the illustrated interconnection of seven npn transistors 220, 223, 224, 226, 227 and 228. One of them, transistor 222, responds to the logic output from terminal $D_1$, $D_2$ by performing a simple switching function. The remainder perform a logical operation on the $U_1$ or $U_2$ output by means of the input diode 219 oriented to pass positive-going signals, the common-base-connected amplifier including transistor 220, and the nonlinear common-emitter, differential amplifier circuit including transistors 223, 224 and 226. Transistor 227 provides feedback to the second transistor 224 of the differential amplifier and transistor 228 provides output amplification and buffering. Transistor 226 provides a nonlinear common-emitter circuit resistance for the differential amplifier.

Figure 8:
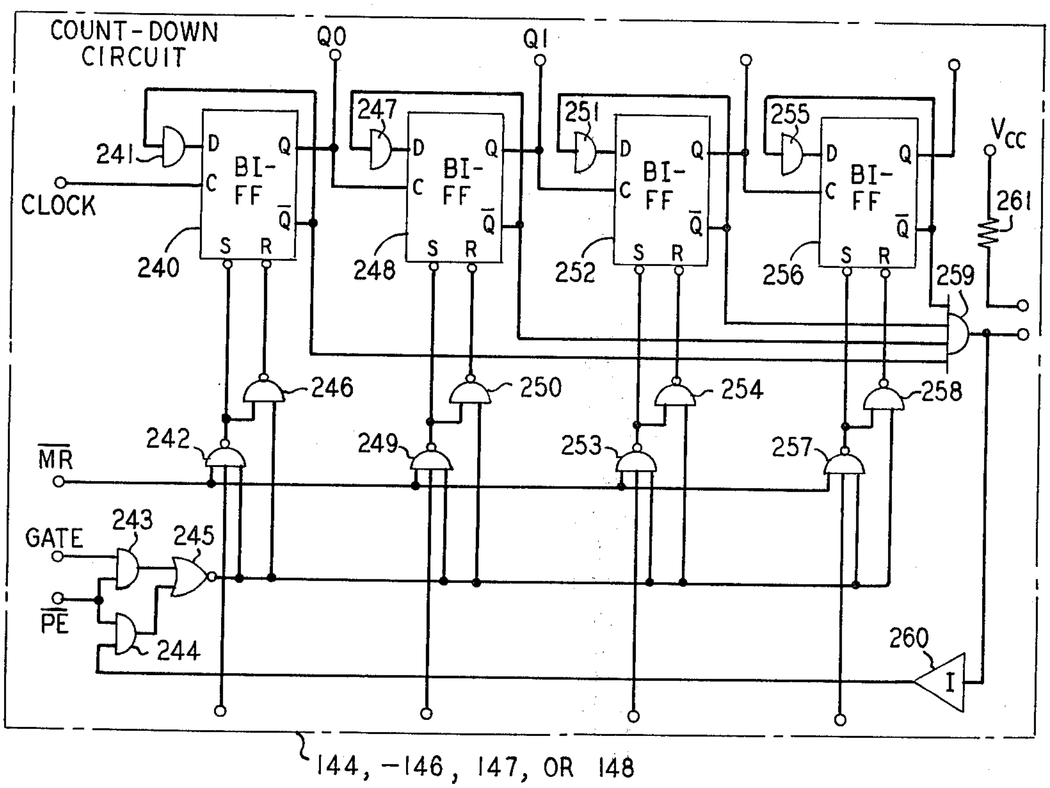
FIG. 8 is a partially schematic and partially block diagrammatic illustration of a typical counter or count-down circuit of which several are used in the feedback loop of the embodiment illustrated in FIGS. 1 and 3.

The illustrative countdown circuit 144, 146, 147 or 148 shown in FIG. 8 includes four bistable flip-flops 240, 248, 252 and 256 interconnected in conventional manner with gates 242, 246, 243, 245, 244 and so forth, to achieve a conventional countdown function. It is important to use commercially available countdown circuits for this function in order to provide an economical system. Such a circuit has a limited frequency response capability. If the input signals tend to drive it too rapidly, no output signal will be obtained at the output of gate 259. It is this indication to which monostable multivibrator 149 of crowbar circuit 32 responds. That is, when the pulse train from the final counter stage drives the monostable multivibrator 149 with a detectable pulse, multivibrator 149 responds by increasing the nominal 0.15 microsecond pulse width to 100 microseconds, for example, and in turn charges capacitor 156 through diode 153. Referring back to FIG. 3, the charge capacitor 156 holds transistor 158 in a saturated state and causes a reverse bias on diode 161 which effectively disconnects the crowbar circuit 132 during the normal loop operation. The output pulse from the final countdown circuit 148 will disappear during any transient which causes voltage-controlled oscillator 21 to move off frequency sufficiently far to make the divider chain toggle frequency exceed its cut-off limit of, for example 8 megahertz, assuming the use of the motorola MC4018 down counter which has a cut-off frequency of 8 MHz.

Figure 9:
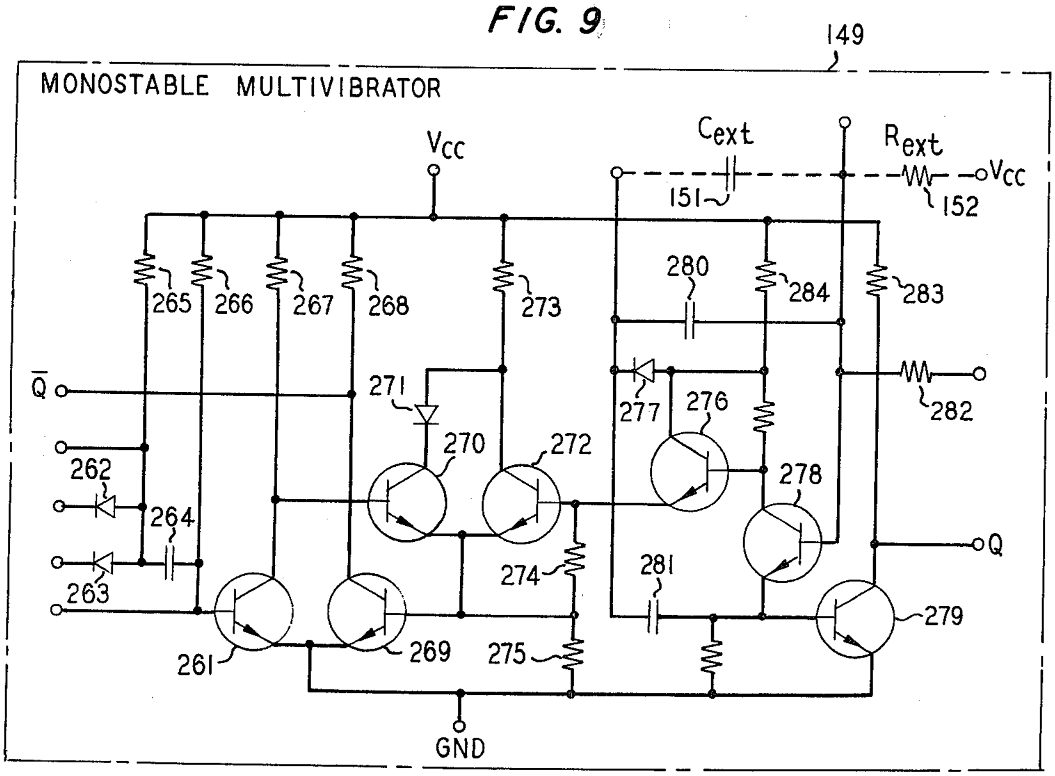
FIG. 9 is a schematic illustration of the monostable multi-vibrator circuit employed to drive the restabilizing circuit which is the principal feature of my invention.

Under this condition the monostable multivibrator 149 produces no sufficient output at the collector of transistor 279 (see FIG. 9) to keep capacitor 156 charged. Therefore, capacitor 156 discharges, causing transistor 158 to turn off. The turning off of transistor 158 in turn allows current through resistor 160 and capacitor 159 to artificially bias the voltage control oscillator control input to a voltage, for example, 3.6 volts, that tunes the voltage control oscillator 21 to a frequency in the approximate center of its tuning range. As mentioned above, this tuning to a mid-range frequency restores the output pulse train from output 148, since its toggle frequency is now not excessive. The restoration of the pulse train thereupon disconnects the crowbar circuit by activating monostable multivibrator and ultimately transistor 158 to cut-off diode 161 and phase lock is quickly regained.

Further details of the monostable multivibrator 149 may be mentioned briefly. The input signal is received at the base of transistor 261 which drives a differential amplifier circuit including transistors 270 and 272, the latter of which is driven through feedback circuitry which incorporates the time constant of the multivibrator. To facilitate in setting time constant, this feedback circuitry includes provision for the external connection of resistor 152 and capacitor 151 as shown also in FIG. 3, between battery supply voltage and the driving point for the final power amplification circuit including transistor 279. If desired, an inverse output can also be obtained from the collector of transistor 269 which is driven in the common emitter circuit of transistors 270 and 272. The further circuit details of the frequency synthesizer of FIG. 1 are considered to be conventional. It should be noted that the circuitry of crowbar circuit 32, which stabilizes the phase-locked loop, is readily interconnected with all of the other more conventional circuitry needed to respond to the failure of the countdown-type feedback signal.

I claim:

1. A frequency synthesizer of the type in which a voltage-controlled oscillator is disposed in a phase-locked loop including a phase and frequency comparator adapted to receive an external reference signal and a feedback signal to generate an error signal, means for applying the error signal to the control circuit of the voltage-controlled oscillator, means for deriving the feedback signal from the output signal generated by the voltage-controlled oscillator, and in which means are provided for altering the loop to facilitate frequency pull-in under some conditions of operation, characterized in that the deriving means includes frequency-count-down circuit means for deriving the feedback signal, said circuit means generating a substantially zero feedback signal when its frequency-response range is exceeded, and in that the loop altering means comprises semiconductive switching means for effectively disabling the loop between the output of the comparator and the voltage-controlled oscillator and for resetting the oscillator to a midpoint of its frequency range when the circuit means generates a substantially zero feedback signal.

2. A frequency synthesizer of the type claimed in claim 1 in which the semiconductive switching means includes an input circuit comprising monostable multivibrator means connected to the frequency-count-down circuit means for providing longer pulses than the frequency-count-down circuit means.

3. A frequency synthesizer of the type claimed in claim 2 in which the semiconductive switching means comprises a series voltage-dividing circuit including a source of reference potential, a resistance, at least one semiconductive junction, said series circuit being connected in series with the control circuit of the voltage-controlled oscillator, said semiconducting switching means including semiconductive driving circuit means coupled between the output of the monostable multivibrator means and said one semiconductive junction for causing said junction to conduct when the pulses from the multivibrator means are absent for a selected period of time, whereupon the series circuit supplies a fixed potential to the control circuit of the voltage controlled oscillator to reset the oscillator.

4. A frequency synthesizer of the type in which a voltage-controlled oscillator is disposed in a phase-locked loop including a phase and frequency comparator adapted to receive an external reference signal and a feedback signal to generate an error signal, means including a low-pass filter for applying the error signal to the control circuit of the voltage-controlled oscillator, means for deriving the feedback signal from the output signal generated by the voltage-controlled oscillator, and in which means are provided for altering the loop to facilitate frequency pull-in under some conditions of operation, characterized in that the deriving means includes frequency-count-down circuit means for deriving the feedback signal, said circuit means generating a substantially zero feedback signal when its frequency-response range is exceeded, and further characterized in that the loop altering means comprises semiconductive switching means for shunting the loop path between the low-pass filter and the control circuit of the voltage controlled oscillator, and having an input coupled to the output of the frequency-count-down circuit means to load down the loop when said frequency-count-down circuit means generates a negligible feedback signal and to apply a fixed potential to said control circuit, thereby resetting the oscillator to a midpoint of its frequency range.

5. A frequency synthesizer of the type claimed in claim 4 in which the semiconductive switching means includes a monostable multivibrator circuit adapted to produce longer control pulses than those generated by the frequency-count-down circuit means, to delay the loading down of the loop for a selected time after the signal from the frequency-count-down circuit has become negligible and to delay removal of the loading down for a second selected period of time after the signal from the frequency-count-down circuit has ceased to be negligible.

* * * * *